(12) United States Patent
Liu et al.

(10) Patent No.: US 7,997,798 B2
(45) Date of Patent: Aug. 16, 2011

(54) MULTI-PURPOSE DOCKING APPARATUS OF DIGITAL X-RAY DETECTOR

(75) Inventors: James Zhengshe Liu, Glenview, IL (US); Lance Gregory, Waukesha, WI (US); Habib Vafi, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/169,201

(22) Filed: Jul. 8, 2008

(65) Prior Publication Data

US 2010/0008473 A1    Jan. 14, 2010

(51) Int. Cl.
*H05G 1/02* (2006.01)
(52) U.S. Cl. .................. 378/198; 378/189
(58) Field of Classification Search .......... 378/167, 378/189, 198
See application file for complete search history.

(56) References Cited

U.S. PATENT DOCUMENTS

| | | |
|---|---|---|
| 3,705,984 A | 12/1972 | Westenberger |
| 4,414,683 A | 11/1983 | Robinson |
| 5,022,065 A | 6/1991 | Wijkstrom |
| 5,226,068 A | 7/1993 | Strawder |
| 5,473,664 A | 12/1995 | Strawder |
| 5,479,471 A | 12/1995 | Buckland |
| 5,563,926 A | 10/1996 | Brotzman |
| 5,640,439 A | 6/1997 | Strawder |
| 5,673,302 A * | 9/1997 | Kriecha et al. ............. 378/167 |
| 5,708,840 A | 1/1998 | Kikinis et al. |
| 5,729,587 A | 3/1998 | Betz |
| 5,844,961 A | 12/1998 | McEvoy et al. |
| 5,867,553 A | 2/1999 | Gordon et al. |
| 5,877,501 A | 3/1999 | Ivan et al. |
| 6,017,149 A | 1/2000 | Strawder |
| 6,044,131 A | 3/2000 | McEvoy et al. |
| 6,143,970 A | 11/2000 | Kowzan |
| 6,337,712 B1 | 1/2002 | Shiota et al. |
| 6,440,072 B1 | 8/2002 | Schuman et al. |
| 6,475,146 B1 | 11/2002 | Frelburger et al. |
| 6,833,867 B1 | 12/2004 | Anderson |
| 7,022,075 B2 | 4/2006 | Grunwald et al. |
| 7,261,465 B2 * | 8/2007 | Butzine et al. ............. 378/198 |
| 7,270,477 B1 | 9/2007 | Kari |
| 7,342,998 B2 | 3/2008 | Kump et al. |
| 2003/0078072 A1 | 4/2003 | Serceki et al. |
| 2005/0135564 A1 | 6/2005 | Dippl et al. |

(Continued)

OTHER PUBLICATIONS

Broadcom press release # 659800, "Broadcom, HP and Linksys Make Wi-Fi Installation as Easy as Pushing a Button," printed Dec. 16, 2005.

(Continued)

*Primary Examiner* — Courtney Thomas
(74) *Attorney, Agent, or Firm* — William Baxter, Esq.; Michael G. Smith, Esq.

(57) ABSTRACT

Systems, methods and apparatus are provided through which in some implementations a docking detector receptacle includes apparatus to cool a portable digital X-ray detector. In addition, systems, methods and apparatus are provided through which in some implementations communication authorization is established between a portable digital X-ray detector and a docking detector receptacle, and communication is performed between the portable digital X-ray detector and the docking detector receptacle using the authorization. In addition, systems, methods and apparatus are provided through which in some implementations a portable digital X-ray detector includes a panel, isolation at least three isolation foam layers, a motherboard and a carbon fiber layer.

17 Claims, 7 Drawing Sheets

U.S. PATENT DOCUMENTS

| | | |
|---|---|---|
| 2005/0136892 A1 | 6/2005 | Oesterling et al. |
| 2005/0197093 A1 | 9/2005 | Wiklof et al. |
| 2006/0067474 A1* | 3/2006 | Schmitt ........................ 378/102 |
| 2006/0070384 A1 | 4/2006 | Ertel |
| 2007/0004980 A1 | 1/2007 | Warner et al. |
| 2007/0140424 A1 | 6/2007 | Serceki |
| 2007/0180046 A1 | 8/2007 | Cheung et al. |
| 2007/0269010 A1 | 11/2007 | Turner |
| 2008/0144777 A1 | 6/2008 | Wilson |
| 2008/0263905 A1* | 10/2008 | Tai ................................ 36/25 R |

OTHER PUBLICATIONS

Broadcom press release #682849, "Broadcom makes Wi-Fi Phone Installation as Easy as Pushing a Button," printed Dec. 16, 2005.

* cited by examiner

MULTI-PURPOSE DOCKING APPARATUS OF DIGITAL X-RAY DETECTOR

FIELD

This invention relates generally to coupling of medical image devices, and more particularly to docking stations for digital X-ray detectors.

BACKGROUND

Digital X-ray detectors have electronic sensors of X-ray electromagnetic energy. The digital X-ray detectors are often referred to as solid-state X-ray detectors.

One type of conventional digital X-ray detector includes an array of pixels composed of switches as FETs (field effect transistors) and light detectors such as photodiodes, the pixels being constructed of amorphous silicon, over which Cesium Iodide (CsI) is deposited. CsI absorbs the X-rays and converts them to light, which is then detected by the photodiodes. The photodiode acts as a capacitor and will store charge. Initialization of the detector takes place prior to an X-ray exposure, when during the course of "scrubbing" the detector, each photodiode is charged to a known voltage. The detector is then exposed to X-rays which are absorbed by the CsI. Light that is emitted in proportion to the X-ray flux then partially discharges the photodiode. After the conclusion of the exposure, the voltage on the photodiode is restored to the initial voltage. The amount of charge required to restore the initial voltage on the photodiode is measured, which becomes a measure of the X-ray dose integrated by the pixel during the length of the exposure. The pixel array is arrayed in a flat panel.

A motherboard includes readout electronics that control readout of the electrical charge from the panel. The primary source of heat in the digital X-ray detectors is the motherboard. Heat is damaging to all electronic equipment, including the panel, and therefore, dissipation of the heat is an important goal in the design of digital X-ray detectors. In addition, U.S. Food and Drug Administration (FDA) safety regulations limit the temperature of the surfaces of medical devices (including digital X-ray detectors) intended for patient contact. Conventional thermal cooling methods in X-ray detectors have been limited to liquid based recirculating heat-exchangers. The conventional cooling methods have been shown to be overly cumbersome, fraught with technical difficulties given the incompatibility of liquids and electronics, as well as expensive. Thus, less expensive and less cumbersome techniques of cooling patient surfaces of digital X-ray detectors would be beneficial.

Furthermore, conventional digital X-ray detectors perform detector diagnostic tests during initial calibration or during service maintenance activities. Additional diagnostic testing during idle periods of the digital X-ray detectors may ensure that the digital X-ray detector is available for use and is functioning properly.

BRIEF DESCRIPTION

The above-mentioned shortcomings, disadvantages and problems are addressed herein, which will be understood by reading and studying the following specification.

In one aspect, a method of controlling a docking detector receptacle includes determining whether or not a portable digital X-ray detector is docked in the docking detector receptacle, establishing authorization between the portable digital X-ray detector and the docking detector receptacle and communicating between the portable digital X-ray detector and the docking detector receptacle using the authorization.

In another aspect, a docking detector receptacle includes a back surface having an undulating surface and a pocket coupled to the back surface, the pocket having interior dimensions into which a portable digital X-ray detector fits snugly.

In yet another aspect, a portable digital X-ray detector includes a first layer of isolation foam, a panel, a second layer of isolation foam, a layer of carbon fiber, a third layer of isolation foam, and a case in contact with the layers of isolation foam, the panel and the layer of carbon fiber.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into three sections. In the first section, apparatus of implementations are described. In the second section, implementations of methods are described. Finally, in the third section, a conclusion of the detailed description is provided.

Apparatus Implementations

In this section, the particular apparatus of such an implementation are described by reference to a series of diagrams.

Figure 1:
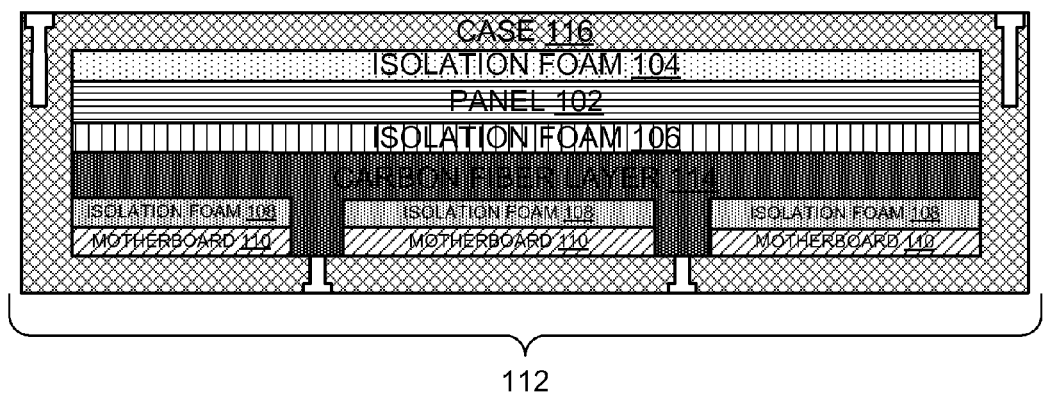
FIG. 1 is cross section block diagram of portable digital X-ray detector, according to an implementation that includes six layers.

FIG. 1 is cross section block diagram of portable digital X-ray detector 100. The portable digital X-ray detector 100 includes six layers. A panel 102 is surrounded with isolation foam layers 104, 106 and 108. The isolation foam layers (104, 106 and 108) thermally isolate the panel 102 from the heat of a motherboard 110 and mechanically protect the panel 102 from mechanical impact damage. The isolation foam layers (104, 106 and 108) also isolate the panel 102 from outside light and absorb light that is generated by Cesium Iodide (CsI) that goes through the panel 102. The structure of the portable digital X-ray detector 100 dissipates heat onto a back cover 112. Manufactures of the isolation foam include Fuji Polymer Industries Co., Ltd. of 7F Kanda KYY Building, 1-9-4 Kajicho, Chiyoda-ku, Tokyo 101-0044 Japan; Kerafol GmbH of Stegenthumbach 4-6, 92676 Eschenbach i.d. Opf. Germany; and Corning Incorporated, One Riverfront Plaza, Corning, N.Y. 14831.

Underneath the panel 102 and the isolation foam layers (104, 106 and 108) is a carbon fiber layer 114 that acts as a panel supporter. The motherboard 110 is isolated from the carbon fiber layer 114 by isolation foam layer 108, and the carbon fiber layer 114 directly contacts a case 116 of the portable digital X-ray detector 100. As a result, the panel 102 is isolated from the heat of the motherboard 110 and most of the heat of the motherboard is transferred to the back cover 112 of the case 116. In addition, some of the heat of the motherboard that migrates to the carbon fiber layer 114 is dissipated to the case 116 through the area of contact between the carbon fiber layer 114 and the case. To reduce weight, the case 116 can be made of plastic and/or carbon graphite.

Each of the components a first layer of isolation foam 104, panel 102, second layer of isolation foam 106, layer of carbon fiber 114, a third layer of isolation foam 108, and the motherboard 110 are rectangular in geometry, and have a first side and a second side being parallel to each other. The first and second sides of each component have a greater surface area than any of the other of the six sides of the component.

While the portable digital X-ray detector 100 is not limited to any particular panel 102, isolation foam layers 104, 106 and 108, motherboard 110, back cover 112, carbon fiber layer 114 and case 116, for sake of clarity, a simplified panel 102, isolation foam layers 104, 106 and 108, motherboard 110, back cover 112, carbon fiber layer 114 and case 116 are described. The first side of the panel 102 is in direct contact with the second side of the first layer of isolation form 104, the first side of the second layer of isolation foam 106 being in direct contact with the second side of the panel 102, the first side of the layer of carbon fiber 114 being in direct contact with the second layer of isolation foam 106 and the first side of the third layer of isolation foam 108 being in direct contact with the first side of the layer of carbon fiber 114.

Figure 2:
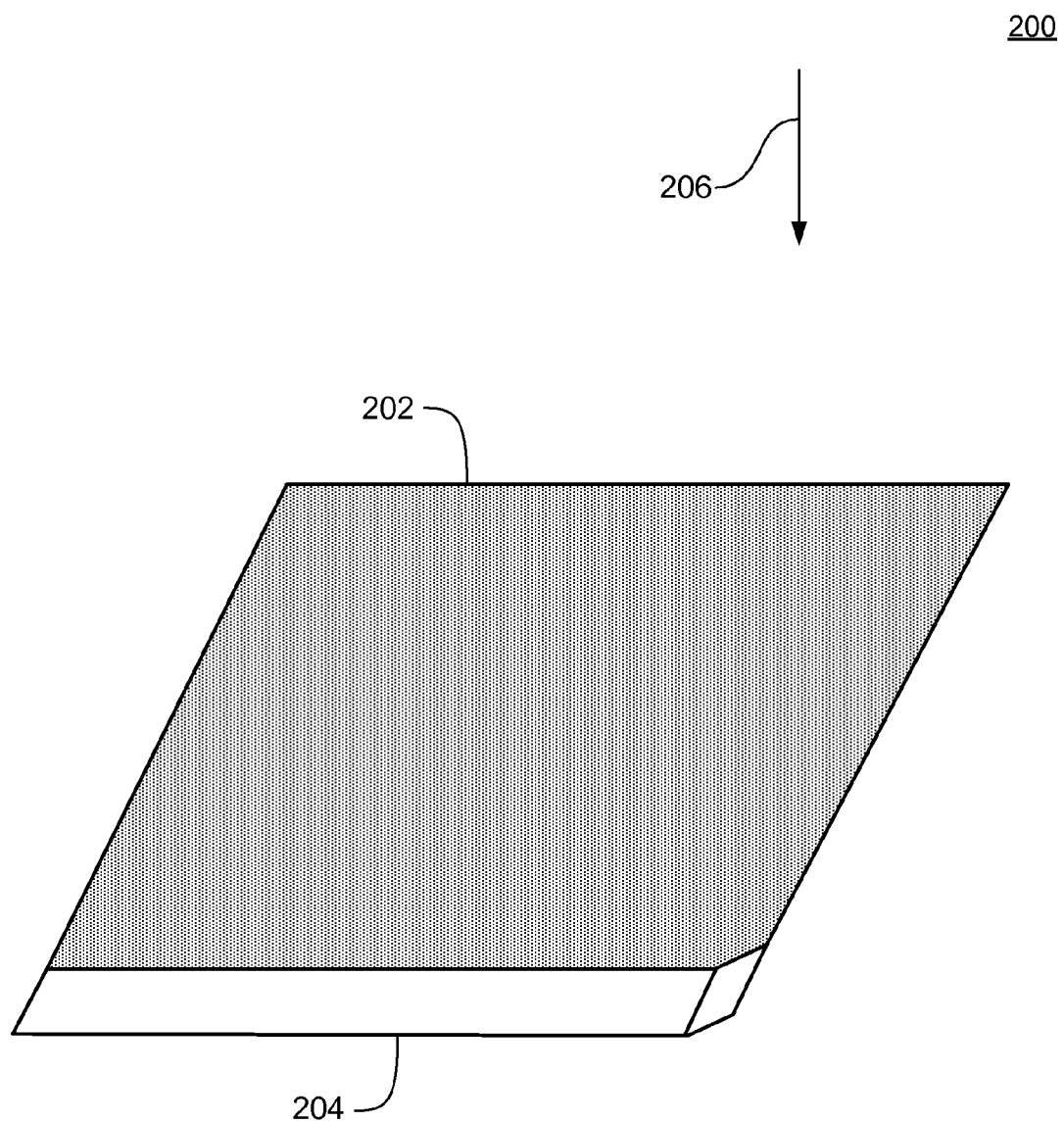
FIG. 2 is an isometric block diagram of a docking detector receptacle, according to an implementation.

FIG. 2 is an isometric block diagram of a docking detector receptacle 200, according to an implementation. Apparatus 200 helps dissipate heat from the back cover of the portable digital X-ray detector between image acquisitions while the portable digital X-ray detector is in the receptacle.

Apparatus 200 includes a back surface 202 and a pocket 204. A portable digital X-ray detector, such as portable digital X-ray detector 100, has dimensions and/or apparatus that allow the portable digital X-ray detector to fit snugly in the pocket 204, whereupon, a back cover of the portable digital X-ray detector directly contacts the back surface 202 of the docking detector receptacle 200. The direct contact between the back cover of the portable digital X-ray detector and the back surface 202 of the docking detector receptacle 200 helps dissipate heat from the back cover of the portable digital X-ray detector into the back surface 202 of the docking detector receptacle 200, thus, the back surface 202 of the docking detector receptacle 200 acts as a heat sink for heat in the back cover of the portable digital X-ray detector.

The docking detector receptacle 200 can be installed in an orientation with the docking pocket 204 down 206 in which a portable digital X-ray detector is inserted vertically into the pocket 204, placing the back cover 112 of the portable digital X-ray detector against the back surface 202 of the docking detector receptacle 200 so that gravity holds the portable digital X-ray detector in the pocket 204. Other installations with other orientations can be implemented, in which apparatus (not shown) helps hold a portable digital X-ray detector in the pocket 204.

Figure 6:
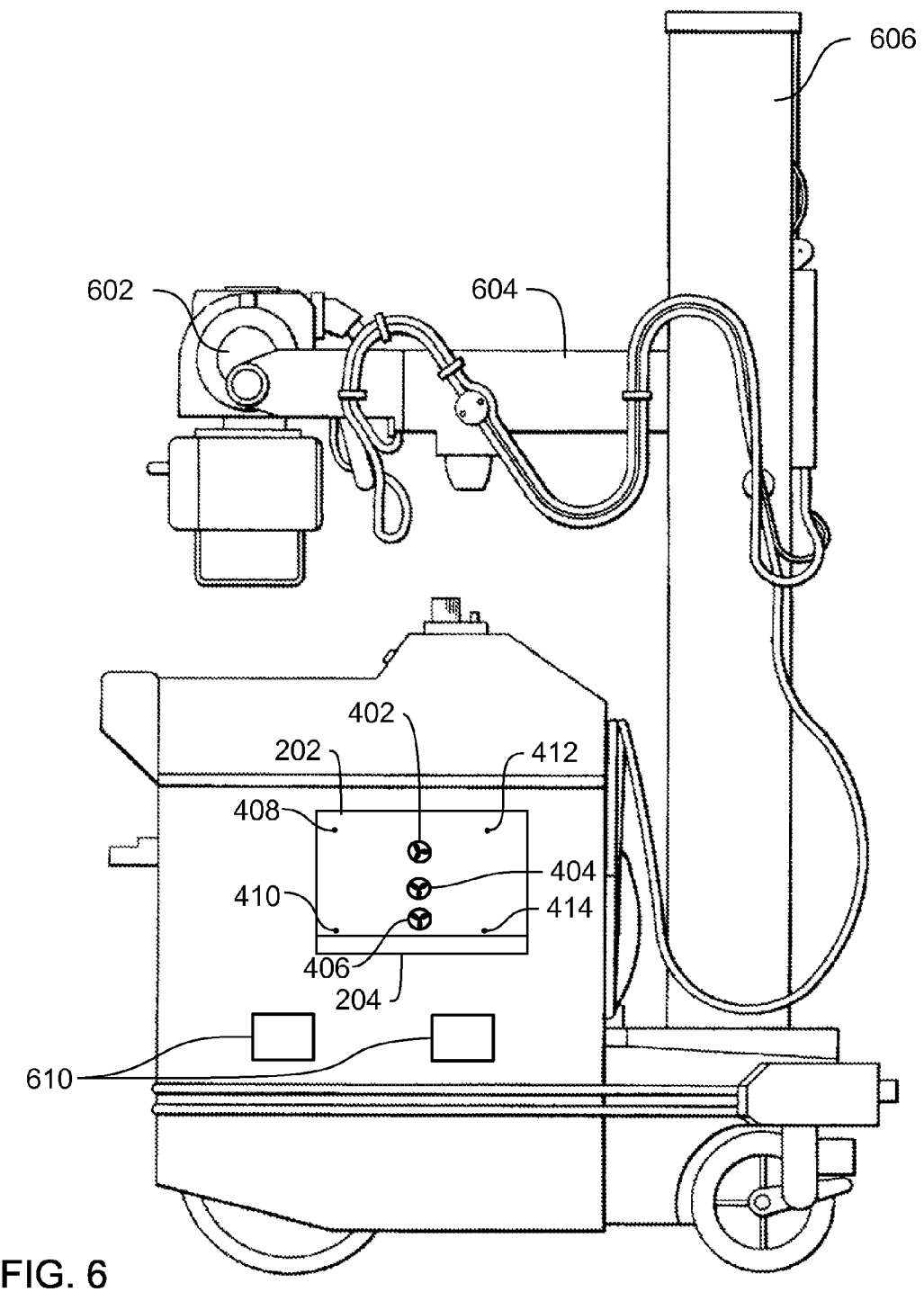
FIG. 6 is a side view of mobile digital X-ray imaging system, according to an embodiment having one or more docking detector receptacles.

The docking detector receptacle 200 can be installed or mounted in or on a mobile medical imaging unit. One example of a mobile medical imaging unit is shown in FIG. 6. Typically, a medical imaging technologist drives the mobile medical imaging unit from patient room to room.

In typical usage and operation, a portable digital X-ray detector, such as portable digital X-ray detector 100, docks in a docking detector receptacle, such as docking detector receptacle 200, during most of the time. The portable digital X-ray detector is removed from the receptacle when the portable digital X-ray detector is used to acquire an image. When the portable digital X-ray detector is docked in the docking detector receptacle, heat from the portable digital X-ray detector is transferred to the back cover 112 of the portable digital X-ray detector to the docking detector receptacle. Thus, docking the portable digital X-ray detector in the docking detector receptacle during non-use times of the portable digital X-ray detector has the effect of cooling the portable digital X-ray detector during the lengthy periods of time that the portable digital X-ray detector is not being used for imaging. The thermal management provided by docking detector receptacle 200 requires less time to cool patient contact surfaces in the docking detector receptacle 200, thus increasing patient throughput, having the benefit to the both the patient and the operator of the docking detector receptacle 200.

Figure 3:
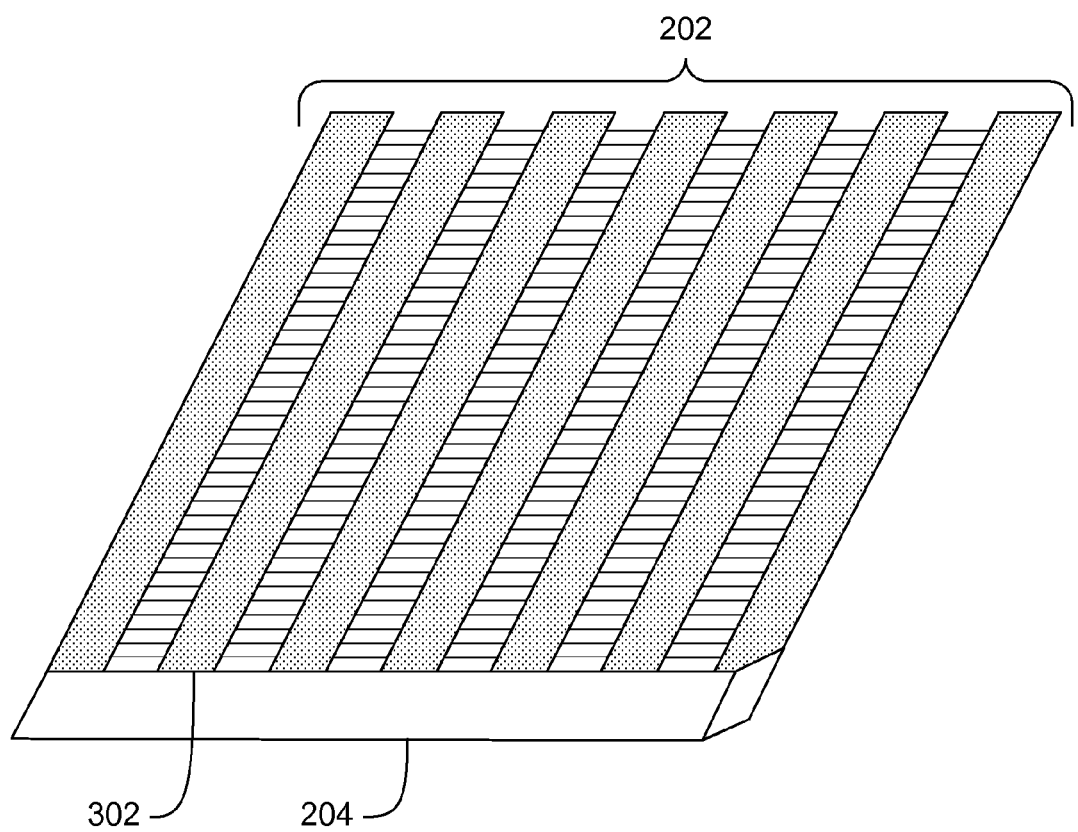
FIG. 3 is an isometric block diagram of a docking detector receptacle, according to an implementation having an enlarged surface area.

FIG. 3 is an isometric block diagram of a docking detector receptacle 300, according to an implementation having an enlarged surface area. Apparatus 300 provides cooling to a portable digital X-ray detector.

To improve the thermal radiant efficiency of the detector receptacle head spreading performance, the back surface 202 of the receptacle can be made with a larger surface area similar to a header. In the example of FIG. 3, the enlarged surface area is accomplished by a corrugated surface, or other undulating surface. The corrugated surface of the back surface 202 includes a number of ribs 302.

Figure 4:
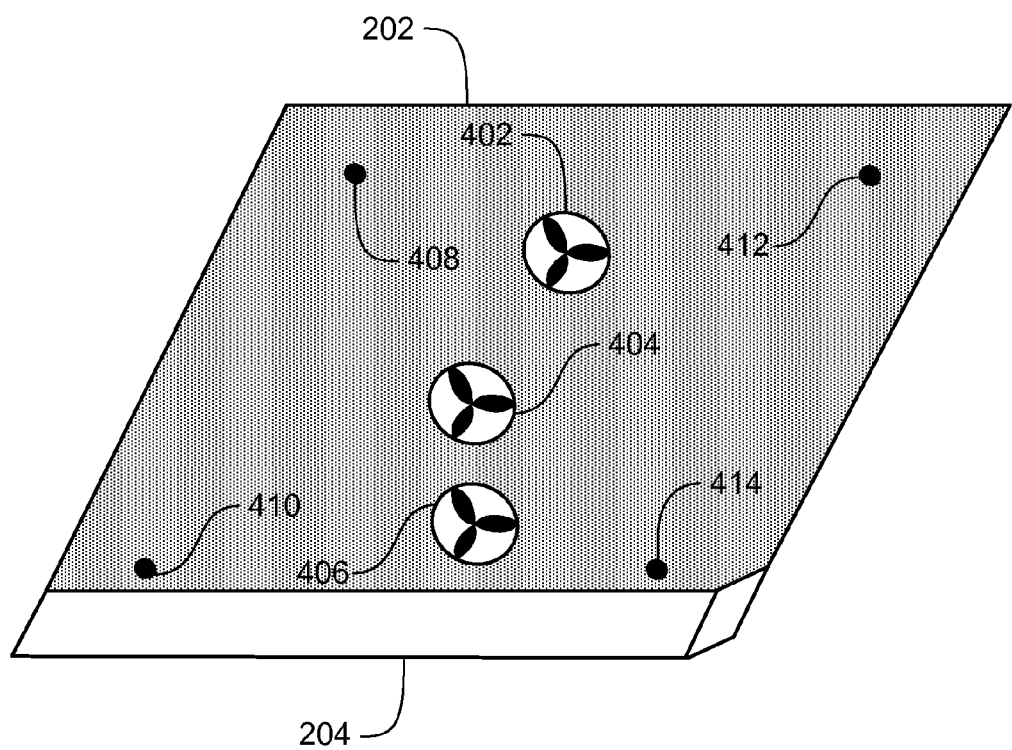
FIG. 4 is an isometric block diagram of a docking detector receptacle, according to an implementation having electric fan(s) and/or spacing pad(s)

FIG. 4 is an isometric block diagram of a docking detector receptacle 400, according to an implementation having electric fan(s) and/or spacing pad(s). Apparatus 400 provides cooling to a portable digital X-ray detector.

Docking detector receptacle 400 can include one or more electrical fans (402, 404 and/or 406). Docking detector receptacle 400 can include one or more spacing pads (408, 410, 412 and/or 414). The spacing pad(s) (408, 410, 412 and/or 414) are raised areas of topographical relief on the back surface 202 of the docking detector receptacle 400 that prevent contact between most of the back cover 112 of a portable digital X-ray detector 100 and the back surface 202 of the docking detector receptacle 400, thus providing a gap in which air can flow between the back cover 112 of a portable digital X-ray detector 100 that is placed in the pocket 204 of the docking detector receptacle 400. The airflow directly blows on the back cover 112 of the docking detector receptacle 400 and removes heat away from the docking detector receptacle 400. When a portable digital X-ray detector 100 is placed in the pocket 204 of the docking detector receptacle 400, airflow blows directly on the back cover 112 of a portable digital X-ray detector 100 and removes heat away from the back cover 112 of the portable digital X-ray detector.

The position, size and number of electrical fans (402, 404 and/or 406) shown in FIG. 4 is merely illustrative. Other positions, sizes and quantities of electrical fans (402, 404 and/or 406) are possible. In some implementations, the electrical fan(s) are magnetic bearing electrical fan(s).

In some implementations of docking detector receptacle 400, a switch (not shown) is built in the pocket 204 so that the fans (402, 404 and/or 406) cease operation when a portable digital X-ray detector is removed from the pocket 204.

Figure 5:
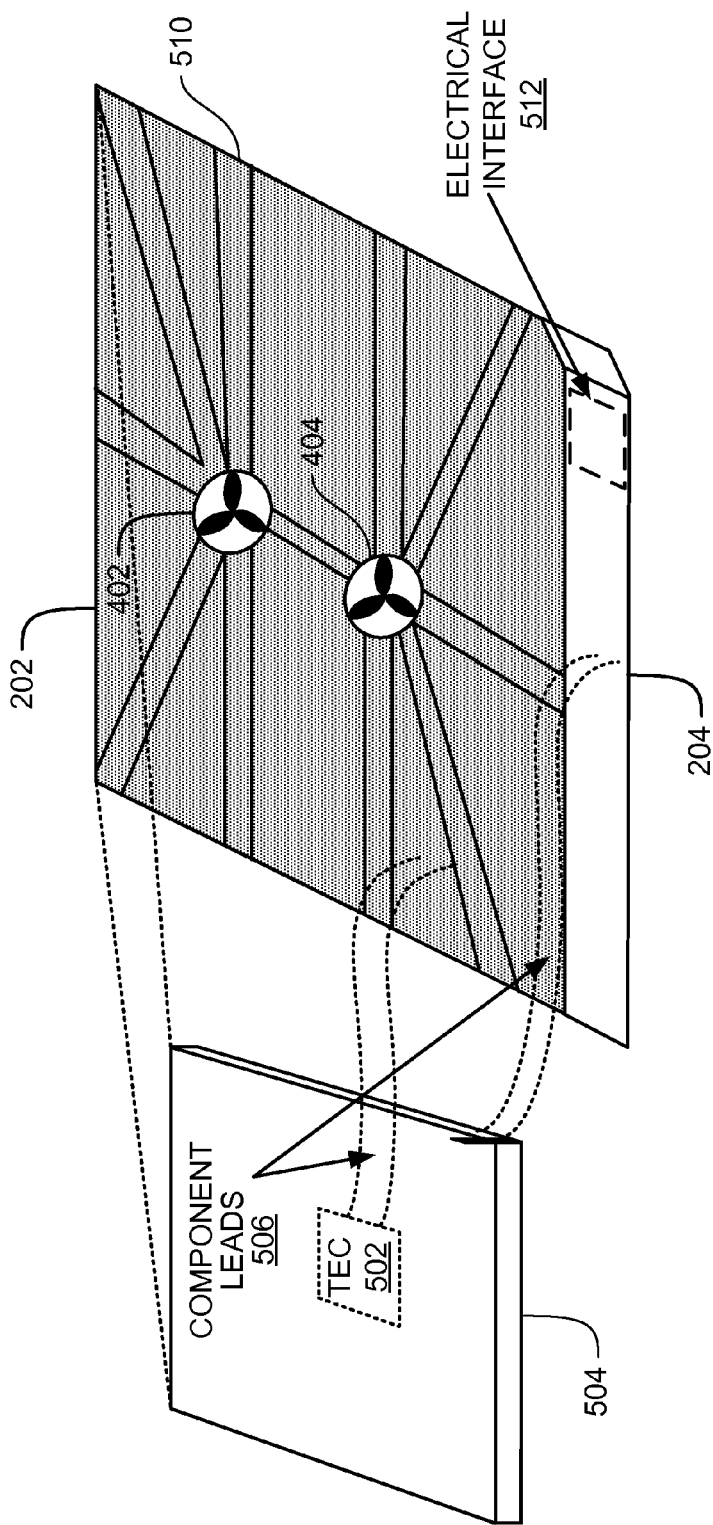
FIG. 5 is an isometric block diagram of a docking detector receptacle, according to an implementation having a thermal-electric controller, airflow slot(s) and/or electric fan(s)

FIG. 5 is an isometric block diagram of a docking detector receptacle 500, according to an implementation having a thermal-electric controller, airflow slot(s) and/or electric fan(s). Apparatus 500 provides cooling to a portable digital X-ray detector.

Some implementations of the docking detector receptacle 500 include one or more thermal electric cooler (TEC) radiator plate(s) 502 or another type of thermal-electric controller, such as a Peltier thermal-electric controller, a Seeback thermal-electric controller, a Thomson thermal-electric controller or a Peltier-Seebeck thermal-electric controller. When a portable digital X-ray detector 100 is inserted into the pocket 204 of the docking detector receptacle 500, the back cover 112 of the portable digital X-ray detector 100 is in contact with TEC radiator plate(s) 502 in the docking detector receptacle 500. The portable digital X-ray detector is cooled through the back cover 112 by the TEC radiator plate(s) 502, conductive, radiative, and convective thermal transfer during idle (between exams) periods. In some implementations, the TEC radiator plate(s) 502 are located in positions that are across from areas in the portable digital X-ray detector that are expected to be relative "hot spots" in the portable digital X-ray detector. The TEC radiator plate(s) 502 can include PNP bipolar junction transistor(s).

In some implementations, the TEC radiator plate(s) 502 are mounted in a TEC radiator plate assembly 504. The TEC radiator plate assembly 504 is operably coupled to the docking detector receptacle 500 and also includes component leads 506 that operably couple the TEC radiator plate assembly 504 to the docking detector receptacle 500. Some implementations of TEC radiator plate assembly 504 also include a switch 508 that is toggled upon the presence or absence of a portable digital X-ray detector in the pocket 204 of the docking detector receptacle 500.

The position, size and number of TEC radiator plate(s) 502 shown in FIG. 5 are merely illustrative. Other positions, sizes and quantities of TEC radiator plate(s) 502 are possible.

Some implementations of the docking detector receptacle 500 include one or more airflow slot(s). Airflow slot 510 is one example of the airflow slot(s). The airflow slots are recessed areas in the back surface of the docking detector receptacle 500 that when a portable digital X-ray detector is inserted into the pocket 204 of the docking detector receptacle 500, permit relatively warmer air to flow out of the airflow slot, and/or relatively cooler air to flow in to the airflow slot, thus providing cooling to the back cover of the portable digital X-ray detector. When a portable digital X-ray detector 100 is inserted into the pocket 204 of the docking detector receptacle 500 that has airflow slot(s), the portable digital X-ray detector is cooled through the back cover 112 in conductive, radiative, and convective thermal transfer during idle (between exams) periods. In some implementations, the airflow slots(s) are located in positions that are across from areas in the portable digital X-ray detector that are expected to be relative "hot spots" in the portable digital X-ray detector.

The position, size and number of airflow slot(s) shown in FIG. 5 are merely illustrative. Other positions, sizes and quantities of airflow slot(s) are possible.

Similar to docking detector receptacle 400, docking detector receptacle 500 can include are one or more electrical fans (402 and/or 404).

Some implementations of docking detector receptacle 500 include an electrical interface 512. The electrical interface 512 is operable to electrically and communicatively couple the docking detector receptacle 500 to a portable digital X-ray detector. In some implementations, such as shown in FIG. 5, the electrical interface 512 is located on the inside of the pocket 204 and is positioned to physically and electrically couple to an electrical interface that is located on the exterior of the portable digital X-ray detector (not shown). The electrical interface on the exterior of the portable digital X-ray detector is electrically and communicatively coupled to an internal battery of the portable digital X-ray detector. When the portable digital X-ray detector is placed in the pocket 204 of the portable digital X-ray detector, the electrical interface 512 on the inside of the pocket 204 provides power to the internal battery of the portable digital X-ray detector through the electrical interface on the exterior of the portable digital X-ray detector. Thus, the internal battery of the portable digital X-ray detector can be recharged during the idle periods of operation of the portable digital X-ray detector when the portable digital X-ray detector is placed in the pocket 204 of the docking detector receptacle 500.

In other implementations, the electrical interface 512, also provides a communications link to the portable digital X-ray detector. The communications can include diagnostic testing information on the status of the portable digital X-ray detector. The diagnostic testing information can be collected by the processor of the portable digital X-ray detector either during operation of the portable digital X-ray detector while the portable digital X-ray detector is being used, and/or the diagnostic testing information can be collected by the processor of the portable digital X-ray detector while the portable digital X-ray detector is in the pocket 204, and/or the diagnostic testing information can be collected by a processor that is external to portable digital X-ray detector while the portable digital X-ray detector while is in the pocket 204. The external processor can be located either in the docking detector receptacle 500 or in another device that is electrically and communicatively coupled to the docking detector receptacle 500.

Docking detector receptacle 500 provide a multi-purpose docking receptacle for portable wireless X-ray detectors providing the capability to thermally cool the external detector surface between clinical uses, while at the same time recharging the detector's internal battery, and performing general diagnostic tests to verify proper detector operation.

Using a thermal-electric controller device 502 with a radiative cold-plate assembly of components of a first layer of isolation foam 104, panel 102, second layer of isolation foam 106, layer of carbon fiber 114, a third layer of isolation foam 108, and the motherboard 110, combined with hidden magnetic bearing fans 402, 404 and/or 406, a significant heat-load can be removed from the external surfaces of a portable wireless digital X-ray detector. Additionally, the portable digital X-ray detector can be routinely docked to the docking detector receptacle 200, 300, 400 and/or 500 for periodic recharging and data resynchronization activities. The combination of docking detector receptacle and portable wireless digital X-ray detector having an electrical interface 512 can provide battery charging capability while at the same time providing diagnostic test capability to ensure proper detector operations at all times.

In addition, docking detector receptacle 200, 300, 400 and/or 500 used during idle (or between exam) periods, will provide additional thermal transfer, lowering the external surface temperature of the portable digital X-ray detector below the manufacturer's upper limits. Performing general diagnostic tests during the idle periods will also improve operator confidence that the portable digital X-ray detector is in proper working order. Conversely, these tests will also alert the operator to problems before the portable digital X-ray detector is put back into operation and the patient is exposed un-necessarily. In addition, re-charging the battery at the same time as cooling the portable digital X-ray detector is beneficial.

FIG. 6 is a side view of mobile digital X-ray imaging system 600 according to an embodiment having one or more docking detector receptacles. Mobile digital X-ray imaging system 600 includes an X-ray source 602 that is mounted to the end of a horizontal arm 604. The X-ray source 602 is positionable over an area of concern on a patient. The X-ray source 602 is typically mounted through a gimbal type arrangement in which a column 606 rotates to move the X-ray source from the park position on the mobile X-ray unit base 608 to the appropriate position in order to take an X-ray image of the patient.

Mobile digital X-ray imaging system 600 also includes one or more network adapters 612. Two network adapters in the plurality of network adaptors 612 are shown in FIG. 6, but any number of network adapters can be implemented. In implementations where two or more network adapters 612 is included, one of the network adapters 612 is used to connect to an external digital X-ray detector. One of the other additional network adapters 612 is used as an interface to an electronic system that is operable to display an image from the mobile digital X-ray imaging system 600. At least one of the network adapters 612 is a conventional network adapter, such as an Ethernet adapter.

Mobile digital X-ray imaging system 600 also includes one or more docking detector receptacles 400, such as docking detector receptacle 400 shown in FIG. 6. In FIG. 6, the docking detector receptacle is mounted on the side of the mobile digital X-ray imaging system 600, such as on the back of the mobile digital X-ray imaging system 600.

Mobile digital X-ray imaging system 600 network adapters 610 are operably coupled to the docking detector receptacle through a wired and/or a wireless communication link (not shown). The communication link provides a communication path between the docking detector receptacle and the mobile digital X-ray imaging system 600 electronic system that is operable to display an image from the mobile digital X-ray imaging system 600. Thus, diagnostic testing information from a portable digital X-ray detector can be transmitted from the portable digital X-ray detector when the portable digital X-ray detector is docked in the pocket 204 of the docking detector receptacle 400, through an electrical interface of the docking detector receptacle 400, such as electrical interface 512, to the electronic system that is operable to display an image.

In some implementations, both the mobile X-ray unit base 608 and the digital X-ray detector 100 have network adapters. In that case, both the mobile X-ray unit base 608 and the digital X-ray detector 100 operably couple to separate network jacks. In some implementations of such a case, the mobile X-ray unit base 608 includes only one network adapter.

In an alternative implementation, mobile digital X-ray imaging system 600 includes only one network adapter to communicate to the electronic system that is operable to display an image from the mobile digital X-ray imaging system 600.

Mobile digital X-ray imaging system 600 shows a network adaptor for a wired Ethernet connector. However mediums other than wires can be implemented, such as wireless connection (e.g. infrared or radio) to couple or connect the mobile digital X-ray imaging system 200 to a network.

Method Implementations

In the previous section, apparatus of the operation of an implementation was described. In this section, the particular methods of such an implementation are described by reference to a series of flowcharts.

Figure 7:
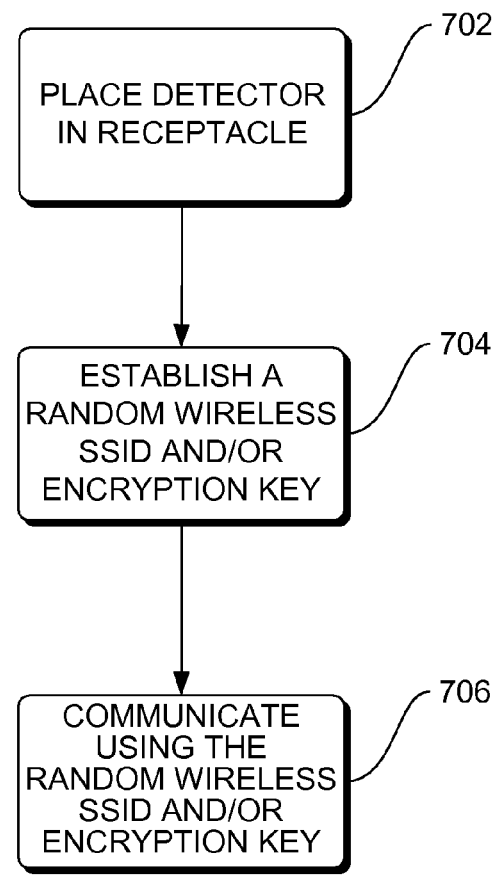
FIG. 7 is a flowchart of a method of communication between a docking detector receptacle and a portable digital X-ray detector, according to an implementation.

FIG. 7 is a flowchart of a method 700 of communication between a docking detector receptacle and a portable digital X-ray detector, according to an implementation. Method 700 provides security to the confidential information transmitted between a docking detector receptacle and a portable digital X-ray detector.

Method 700 includes placing a portable digital X-ray detector in a pocket of the docking detector receptacle at block 702.

After the portable digital X-ray detector is determined to be docked in the pocket of the docking detector receptacle, method 700 also includes establishing authorization between the portable digital X-ray detector and the docking detector receptacle, at block 704. The authorization can include an encryption key and/or a random wireless service set identifier (SSID). A SSID is a 32-character unique identifier attached to the header of packets sent over a wireless communication link between the portable digital X-ray detector and the docking detector. The SSID acts as a password when portable digital X-ray detector connects to the docking detector receptacle or other base station. The SSID differentiates one wireless communication link from another, so all access points and all devices attempting to connect to a specific wireless communication link must use the same SSID. The portable digital X-ray detector will not be permitted wireless communication link to the portable digital X-ray detector and the docking detector unless portable digital X-ray detector can provide the unique SSID. Because an SSID can be sniffed in plain text from a packet the SSID does not provide any security to the wireless communication link.

Method 700 also includes communicating between the portable digital X-ray detector and the docking detector receptacle using the authorization, at block 706. In some implementations, the communications can include diagnostic testing information on the status of the portable digital X-ray detector. In implementations where the communication includes diagnostic information, the diagnostic information is output from diagnostic testing on the portable digital X-ray detector that is performed before and/or after the portable digital X-ray detector is placed in the pocket of the docking detector receptacle and in which the communicating includes sending the diagnostic testing information from the portable digital X-ray detector to the docking detector receptacle.

CONCLUSION

A docking detector receptacle and a new portable digital X-ray detector is described. Although specific implementations are illustrated and described herein, it will be appreciated by those of ordinary skill in the art that any arrangement which is calculated to achieve the same purpose may be substituted for the specific implementations shown. This application is intended to cover any adaptations or variations. For example, although described in procedural terms, one of ordinary skill in the art will appreciate that implementations can be made in any other term that provides the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future, different and new docking detector receptacles and portable digital X-ray detectors.

The terminology used in this application is meant to include all docking detector receptacles and portable digital X-ray detectors environments and alternate technologies which provide the same functionality as described herein

We claim:

1. A mobile digital X-ray imaging system comprising:
   a base;
   a vertical column attached to the base;
   a horizontal arm attached to the vertical column;
   an X-ray source mounted to an end of the horizontal arm;
   at least on network adapter operably coupled to a docking detector receptacle through a communication link, the communication link providing a communication path between the docking detector receptacle;
   the docking detector receptacle comprising:
      a back surface having a ribbed surface on a side of the back surface, wherein the back surface further comprises at least one electrical fan; and
      a pocket coupled to the back surface, the pocket having interior dimensions into which a portable digital X-ray detector fits snugly.

2. The docking detector receptacle of claim 1, wherein the ribbed surface further comprises:
   seven ribs.

3. The docking detector receptacle of claim 1, wherein the back surface further comprises:
   at least one spacing pad.

4. The docking detector receptacle of claim 1, wherein the back surface further comprises:
   at least one airflow slot.

5. The docking detector receptacle of claim 1, wherein the back surface further comprises:
   at least one thermal-electric controller.

6. The docking detector receptacle of claim 1, wherein the pocket further comprises:
   an electrical interface located on the inside of the pocket and operable to physically and electrically couple to an electrical interface of a portable digital X-ray detector.

7. A mobile digital X-ray imaging system comprising:
   a base;
   a vertical column attached to the base;
   a horizontal arm attached to the vertical column;
   an X-ray source mounted to an end of the horizontal arm;
   at least on network adapter operably coupled to a docking detector receptacle through a communication link, the communication link providing a communication path between the docking detector receptacle;
   the docking detector receptacle comprising:
      a back surface having an undulating surface, wherein the back surface further comprises at least one electrical fan; and
      a pocket coupled to the back surface, the pocket having interior dimensions into which a portable digital X-ray detector fits snugly.

8. The docking detector receptacle of claim 7, wherein the undulating surface further comprises:
   a corrugated surface.

9. The docking detector receptacle of claim 7, wherein the back surface further comprises:
   at least one spacing pad.

10. The docking detector receptacle of claim 7, wherein the back surface further comprises:
    at least one airflow slot.

11. The docking detector receptacle of claim 7, wherein the back surface further comprises:
    at least one thermal-electric controller.

12. The docking detector receptacle of claim 7, wherein the pocket further comprises:
    an electrical interface located on the inside of the pocket and operable to physically and electrically couple to an electrical interface of a portable digital X-ray detector.

13. A mobile digital X-ray imaging system comprising:
    a base;
    a vertical column attached to the base;
    a horizontal arm attached to the vertical column;
    an X-ray source mounted to an end of the horizontal arm;
    at least on network adapter operably coupled to a docking detector receptacle through a communication link, the communication link providing a communication path between the docking detector receptacle;
    the docking detector receptacle comprising:
       a back surface having an irregular surface, wherein the back surface further comprises at least one electrical fan; and
       a pocket coupled to the back surface, the pocket having an electrical interface located on an inside of the pocket, the electrical interface providing power and communication, the communication including diagnostic testing information, the pocket having interior dimensions into which a portable digital X-ray detector fits snugly.

14. The docking detector receptacle of claim 13, wherein the irregular surface further comprises:
    a corrugated surface.

15. The docking detector receptacle of claim 13, wherein the back surface further comprises:
    at least one spacing pad.

16. The docking detector receptacle of claim 13, wherein the back surface further comprises:
    at least one airflow slot.

17. The docking detector receptacle of claim 13, wherein the back surface further comprises:
    at least one thermal-electric controller.

* * * * *